United States Patent [19]
Duvall et al.

[11] 3,836,899
[45] Sept. 17, 1974

[54] INTRUSION DETECTION AND LOCATING SYSTEM

[75] Inventors: Kenneth M. Duvall, Sunnyvale; Gerald K. Miller, Saratoga, both of Calif.

[73] Assignee: GTE Sylvania Incorporated, Mountain View, Calif.

[22] Filed: Sept. 4, 1973

[21] Appl. No.: 393,797

[52] U.S. Cl. ............................ 340/261, 340/258 R
[51] Int. Cl. ............................................ G08b 13/02
[58] Field of Search ............ 340/258 D, 258 R, 261, 340/16 R

[56] References Cited
UNITED STATES PATENTS

| | | | |
|---|---|---|---|
| 2,787,784 | 4/1957 | Meryman et al. | 340/258 D |
| 3,132,330 | 5/1964 | Donner | 340/261 |
| 3,747,057 | 7/1973 | Brougher | 340/16 R |
| 3,750,127 | 7/1973 | Ayers et al. | 340/261 |
| 3,763,482 | 10/1973 | Burney et al. | 340/258 R |

*Primary Examiner*—Glen R. Swann, III
*Attorney, Agent, or Firm*—John F. Lawler; Norman J. O'Malley; Elmer J. Nealon

[57] ABSTRACT

A disturbance detection and location system comprises an elongated composite sensor line having a pair of closely spaced coaxial electret cables with known different sensitivities over their lengths and circuits responsive to electrical signals from the cables caused by a disturbance for producing an indication of the disturbance and its location. Such a system is useful for fence-type perimeter intrusion detection where the disturbances to be identified are intruders climbing or cutting the fence. The cables have predetermined different responses to the same mechanical disturbance occurring at the different locations throughout their lengths and measurement of this response difference provides a basis for identifying the location of the disturbance along the monitored line. The cables are electrically connected at one of their adjacent ends to signal processing circuits which correlate the difference in known sensitivity-distance variations of the cables to indicate both the existence of a disturbance (climbing of fence, cutting of fence, etc.) and its location along the cables.

9 Claims, 10 Drawing Figures

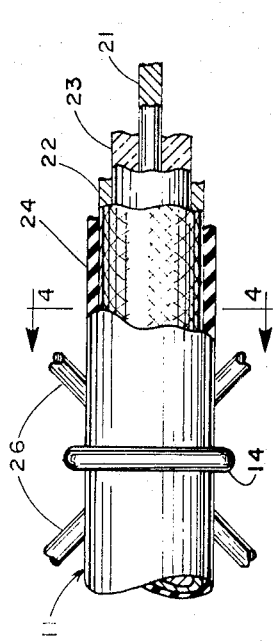
FIG. 3
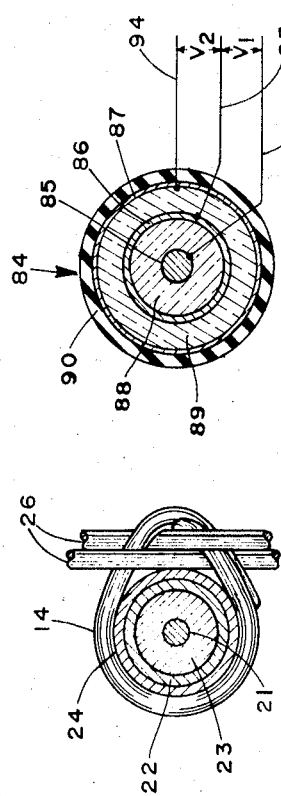
FIG.10
FIG. 4
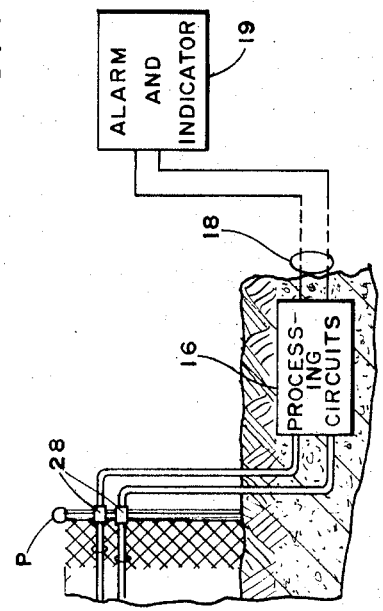
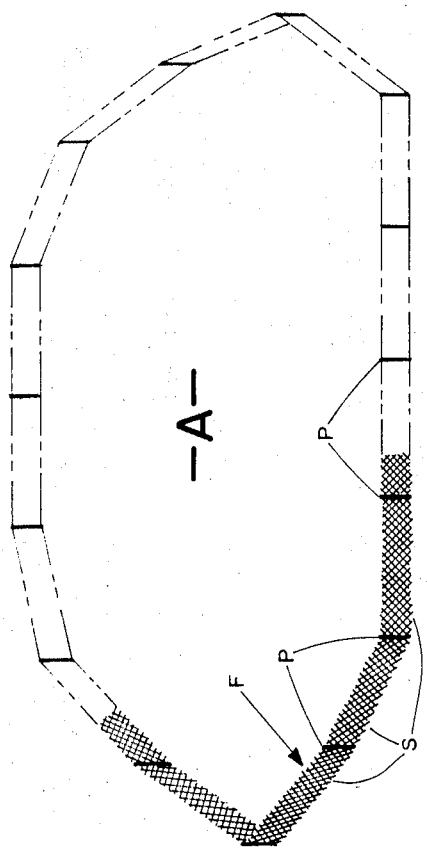
FIG. 1
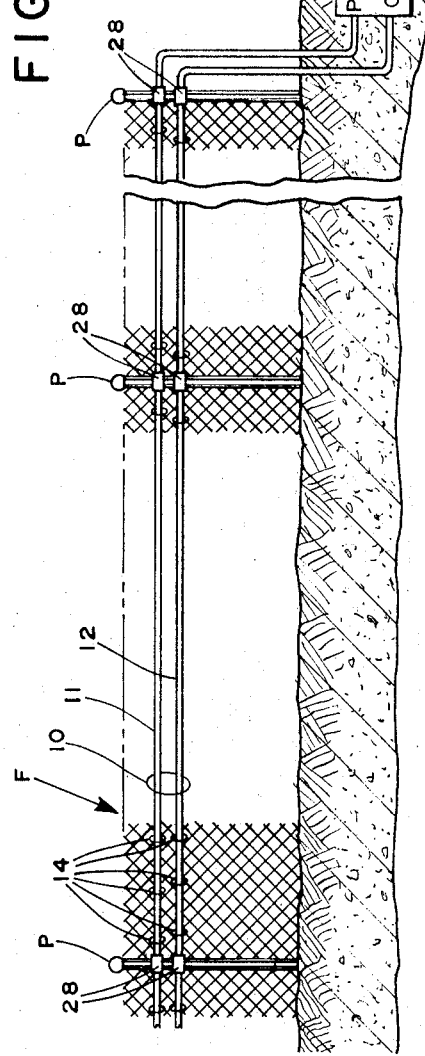
FIG. 2

INTRUSION DETECTION AND LOCATING SYSTEM

BACKGROUND OF THE INVENTION

This invention relates to an improved disturbance detection system of the type useful in perimeter intrusion detection systems. A perimeter-type intrusion detection system described in U.S. Pat. No. 3,763,482 utilizes a coaxial electret cable as a sensor line. The cable is tightly clamped to a chain link fence at intervals throughout its length and constitutes a continuous transducer for converting fence vibrations that may be caused by intruders into electrical signals which are processed by appropriate discrimination circuits for activating remote alarm apparatus. While this system has proven to be extremely effective in detecting intrusions, there remains the problem of determining where the intrusion has occurred. With installations having fence perimeters that are several hundreds of meters or more in length, knowledge of even the approximate location of the intrusion is often vital to effective follow-up action in protecting the property that is threatened. This invention provides such location information.

A general object of this invention is the provision of an improved perimeter protection system which automatically indicates the location of the attempted intrusion along with an indication of the intrusion itself.

A further object is to provide such a system that is low in cost and is relatively inexpensive to install.

SUMMARY OF INVENTION

These and other objects of the invention are achieved with a pair of closely spaced or juxtaposed coextensive continuous transducers having relative sensitivities which vary with their lengths. By comparing the magnitudes of signals from the two transducers with predetermined transducer sensitivity criteria, the disturbance which generated the signals and its location are simultaneously determined.

DESCRIPTION OF DRAWINGS

FIG. 1 is a schematic perspective view of a protected area bounded by a plurality of fence sections of the type with which this invention may be used;

FIG. 2 is a side elevation of a portion of chain link fence to which coaxial electret cables embodying the invention have been connected;

FIG. 3 is an enlarged cut-away portion of one of the coaxial cables of FIG. 2 showing the fence mounted clamp ring;

FIG. 4 is a transverse section taken on line 4—4 of FIG. 3;

FIG. 10 is a cross-section of a triaxial cable useful in the practice of the invention.

DESCRIPTION OF PREFERRED EMBODIMENT

Figure 5:
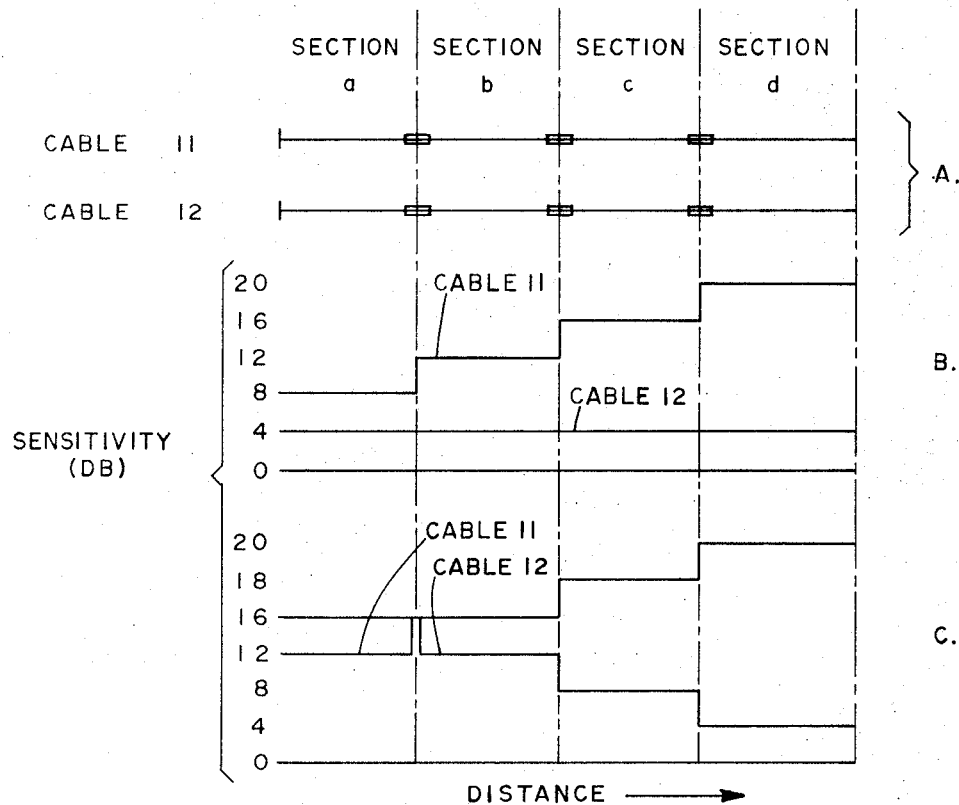
FIGS. 5 and 6 are cable sensitivity diagrams showing the relative sensitivities of two sensor cables.

Referring now to the drawings, FIG. 1 illustrates an area A to be protected bounded by a chain link fence F divided into sections S between posts P. If such a fence is equipped with a coaxial cable transducer system of the type described in U.S. Pat. No. 3,763,482, an alarm is given if an intruder attempts to climb any of the several fence sections. While this protection may be sufficient for the particular requirement as when the risk of immediate damage to the protected area or items in it by intruders is not great, there are many applications where such risk is great so that additionally it is vital to known the location of the intrusion. An example of such need for intruder location information is a several acre storage area for portable property items that are subject to hit and run theft tactics. Another example is the oil or gas storage tank area for a refinery that may be the target for sabotage or vandals. In each case, information on the approximate location of the intrusion is necessary in order that prompt action may be taken for protection or recovery of the property.

In accordance with this invention, such intruder location information is obtained with a system illustrated in FIG. 2 comprising a composite sensor line 10 consisting of coaxial cables 11 and 12 which are mounted on fence F over its entire length. Cables 11 and 12 are spaced closely together and are secured to the main body of the fence by clamp rings 14 so as to provide a tight mechanical coupling between the fence and cables. The cables are connected at one end to a signal processing circuit illustrated as being in the ground while the opposite ends of the cables are open. Circuit 16 processes electrical signals generated by cables 11 and 12 so as to eliminate spurious or false alarm signals and to determine by a logic function to be described the location along the fence of the disturbance which produced the signals. The output of circuit 16 is transmitted by lines 18 to alarm and display or readout apparatus 19 at an appropriate remote monitoring station.

The details of construction of cables 11 and 12 are explained in U.S. Pat. No. 3,763,482. Briefly, each cable, cable 11 for example, comprises an inner conductor 21, see FIGS. 3 and 4, an outer conductor 22, a dielectric filler 23 between these conductors and an outer synthetic insulating cover 24 on outer conductor 22. Dielectric filler 23 is an electret and produces an electrical signal between conductors 21 and 22 when a mechanical force causes relative motion between the dielectric and the outer conductor of the cable. Each of clamp rings 14 tightly secures the cable to the main body of the fence, shown in FIGS. 3 and 4 as strands 26, so that vibrations induced in the fence by an intruder or the like climbing it cause a signal to be generated across the cable conductors.

The sensitivity of this cable transducer is defined as the signal strength (charge) produced on the outer and inner conductors per unit of displacement of the conductors relative to the electret layer. One parameter which affects sensitivity is the amount of charge on the electret filler 23. A technique for making the electret as explained in the aforementioned patent is applying a d-c potential of predetermined magnitude across the outer and inner conductors of the cable while the heat softened filler 23 cools and solidifies. The amount of charge on the filler is determined by the magnitude of the applied d-c potential, the charge generally varying proportionally with the applied d-c biasing voltage.

In accordance with this invention, the sensitivity of each of cables 11 and 12 is different at different locations over the length of the cable and the relative sensitivities of the two cables at each of these locations have predetermined magnitudes which are compared to identify the location. A disturbance at one location causes differently sensitized cables 11 and 12 to produce signals with different voltages and this voltage difference varies from one location to another. By correlating the sensitivities of the cables with distance or location along the fence, the difference in magnitude of the output signals from the cables is indicative of the location of the distrubance producing those signals. It will be understood that the cables may have the same sensitivity at one location so that the difference in signal output for the location is zero.

In the embodiment of the invention shown in FIG. 2, each of cables 11 and 12 is composed of a longitudinal series of cable sections detachably or otherwise connected together by connectors 28 located, for example, at the fence posts P so that the length of the section of coaxial cable corresponds to the length of a section of fence between posts. It should be noted, however, that the length of section of cable may be greater or less than the length of each section of fence, this choice of cable section length being given by way of example and not by way of limitation. The juxtaposed sections of cables 11 and 12 have the same length and different known sensitivities and this difference in sensitivity varies from section to section. Thus the location of a disturbance with this cable arrangement can be made to the accuracy of one cable or fence section. FIG. 5A illustrates four sections $a$, $b$, $c$ and $d$ of cables 11 and 12 and FIGS. 5B and 5C show two ways in which cable sensitivity is varied in accordance with the invention. As shown in FIG. 5B, cable 11 has four sensitivity levels, one for each of the four sections, whereas cable 12 has a constant sensitivity over the four sections producing successively increasing differences in sensitivities between the cables. FIG. 5C illustrates another cable sensitivity configuration in which cable 11 has increasing sensitivity as in FIG. 5B and cable 12 with greater sensitivity than cable 11 in section $a$ has decreasing sensitivity in successive sections so that the sensitivity of cable 11 exceeds that of cable 12 in sections $b$, $c$ and $d$. Appropriate sensing circuits are employed in the processor to distinguish disturbances occurring in sections $a$ and $b$ of the cables shown in FIG. 5C.

Figure 6:
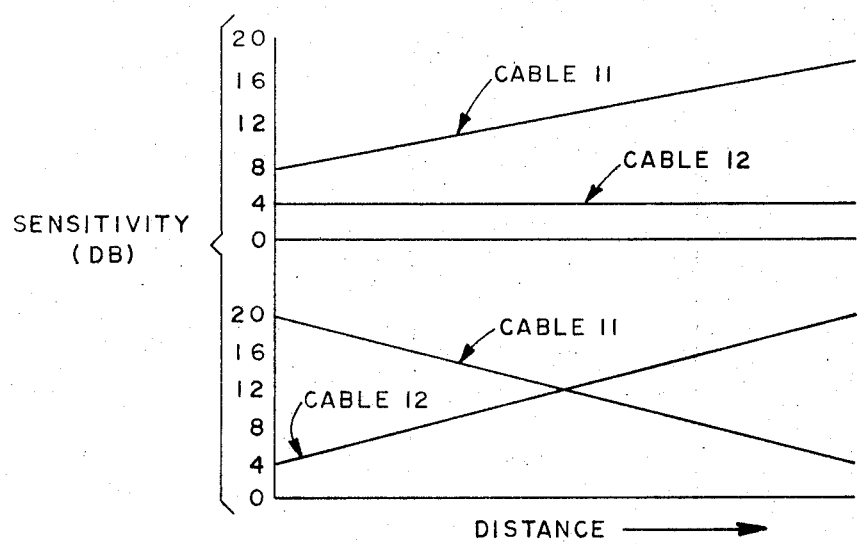

In addition to successively varying the sensitivities of cables 11 and 12 in steps as shown in FIG. 5, the sensitivities of one or both of the cables may also be varied linearly with distance as shown in FIGS. 6A and 6B. Cable 11 is shown in FIG. 6A as having a linearly increasing sensitivity distance whereas cable 12 has a constant sensitivity thereby yielding an increasing sensitivity difference between the cables with distance. FIG. 6B shows that cable 11 has a linearly decreasing sensitivity while cable 12 has a linearly increasing sensitivity with distance so that the sensitivity difference between the cables at first decreases and then increases with a change in sense of the difference sensitivity. The processing circuits for the cables sensitized as shown in FIG. 6B therefore are responsive to the difference in cable sensitivity and the sense or direction of that difference in order to identify the location of the disturbance or intrusion along the protected perimeter or line.

Figure 7:
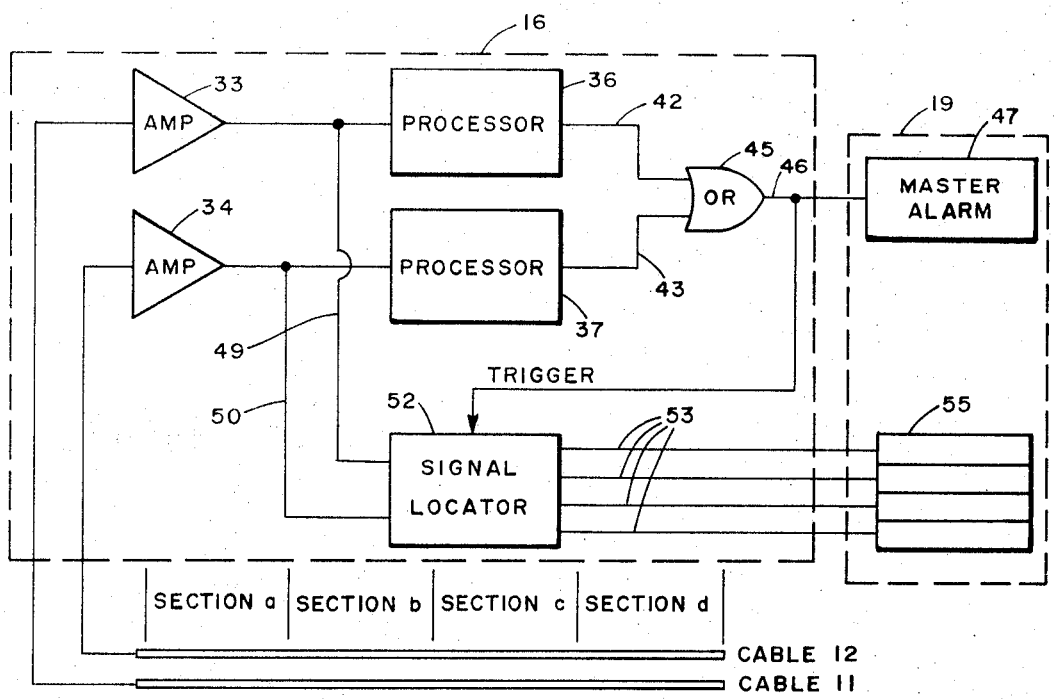
FIG. 7 is a schematic block diagram of the signal processing circuits to which the pair of sensor cables are connected.
Figure 8:
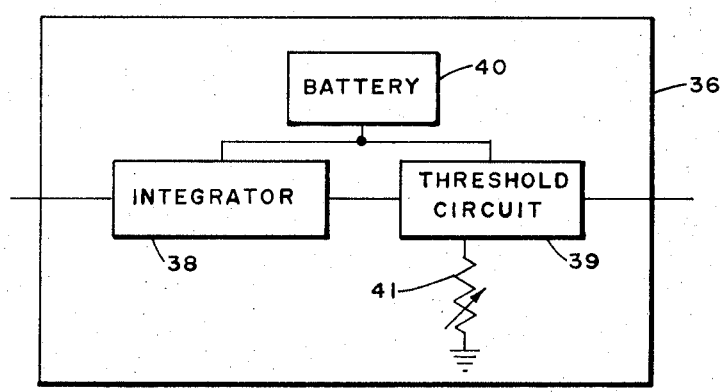
FIG. 8 is a more detailed block circuit diagram of one of the processor circuits of FIG. 7.

The processing circuits 16 are shown in block form in FIG. 7 and comprise bandpass amplifiers 33 and 34 connected to cables 11 and 12, respectively, for amplifying and passing signals having frequencies in the band of interest, for example, 200 – 4,000 Hz. The outputs of the amplifiers are connected to processors 36 and 37, respectively, which integrate and threshold the signals developed on cables 11 and 12 for further discriminating against spurious signals capable of producing false alarms. Processors 36 and 37 are essentially the same and each may comprise an integrator 38, see FIG. 8, and a threshold circuit 39 powered by a battery 40. The threshold level of circuit 39 is adjustable by variable resistor 41. The outputs of processors 36 and 37 on lines 42 and 43, respectively, pass to OR gate 45 which is connected by line 46 to a master alarm 47 at the monitoring station. Thus the master alarm which may be a bell, flashing light or similar or equivalent device, is actuated in response to a signal received from either cable 11 or cable 12.

The outputs of amplifiers 33 and 34 are also connected by lines 49 and 50 to a signal locator circuit 52 having a plurality of output lines 53 connected to display unit 55 which indicates the section of cables 11 and 12 at which an intrusion occurs or is attempted. The output of OR gate 45 applies a trigger signal to locator circuit 52 to enable the latter to produce an output signal on any one of output lines 53. Thus the indication of an intrusion on display unit 55 can occur only if output signals from cables 11 and 12 meet the criteria of processors 36 and 37.

Figure 9:
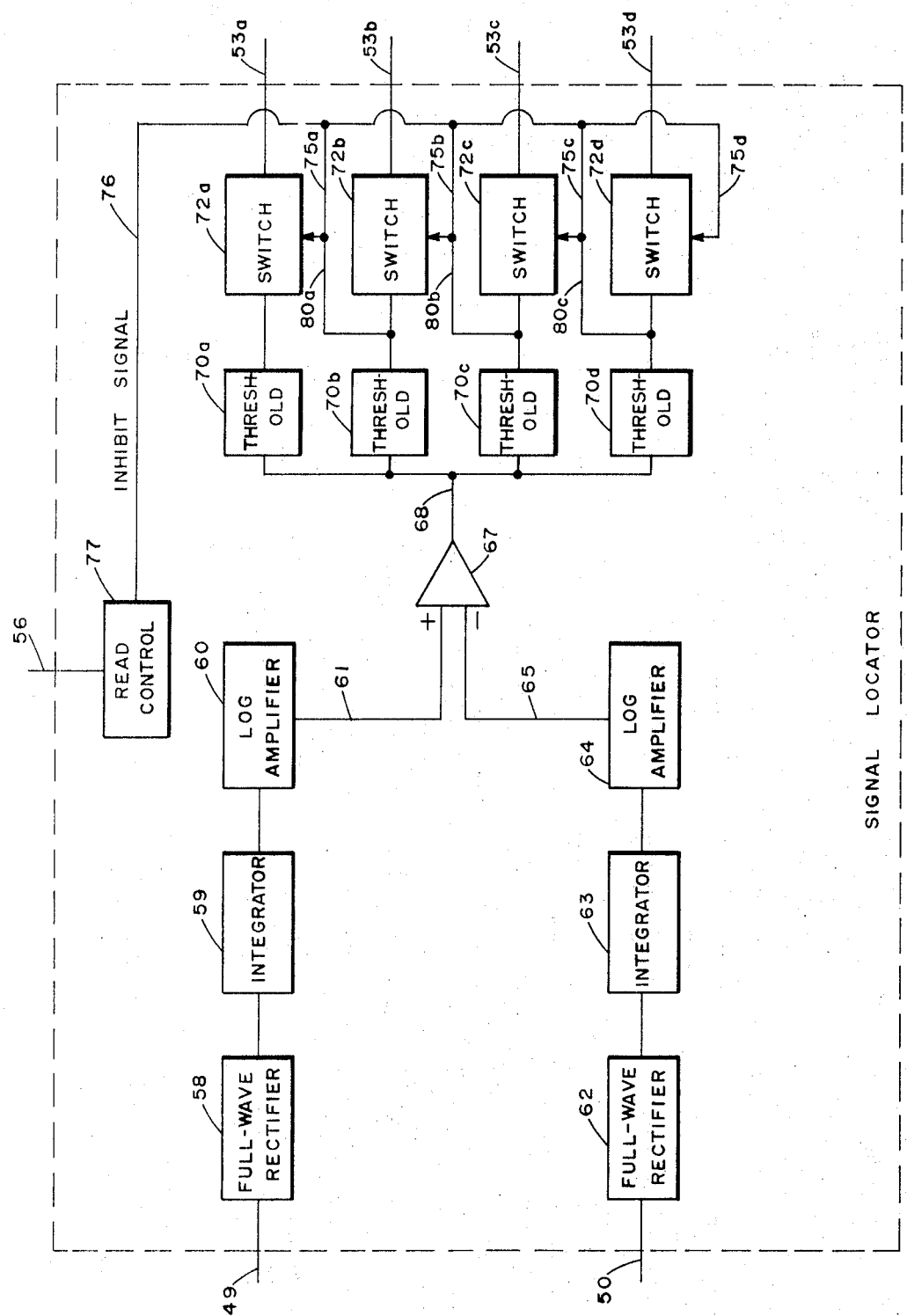
FIG. 9 is a more detailed block circuit diagram of the signal locator circuit of FIG. 7.

Details of signal locator circuit 52 are shown in FIG. 9 in which the amplified output of cable 11 on line 49 is applied successively to a fullwave rectifier 58, an integrator 59 and a log amplifier 60 which produces an output on line 61. Similarly, the amplified output from cable 12 on line 50 is connected successively to fullwave rectifier 62, integrator 63 and log amplifier 64 which produces an output on line 65. Rectifiers 58 and 62 detect the envelope of the signals generated on cables 11 and 12, respectively, and integrators sum the output of the rectifiers for application to the logarithmic amplifiers 60 and 64, respectively. The outputs of the log amplifiers on lines 61 and 65 are applied to a comparator 67 comprising a differential amplifier which produces an output on line 68 corresponding to the difference in outputs of the log amplifiers. Thus the magnitude of the comparator output on line 68 is a measure of the difference in intensity or magnitude of the signals initially generated on cables 11 and 12.

In order to segregate signals developed by cables 11 and 12 according to the relative magnitudes of the signals, the output of comparator 67 on line 68 is applied simultaneously to four threshold circuits $70a - 70d$, inclusive, the outputs of which are connected to switches $72a - 72d$, respectively, having output lines $53a - 53d$, respectively. For cables sensitized as shown in FIG. 5B, threshold circuits $70a - 70d$ have successively higher thresholds corresponding to the differences in sensitivities of cables 11 and 12 at sections $a - d$, respectively. Switches $72a - 72d$ are also connected by lines $75a - 75d$, respectively, to a common line 76 which in turn is connected to the output of a read control unit 77 having its input side connected to line 56 from OR gate 45. The purpose of read control 77 is to generate an inhibit signal which disables each of switches 72 when there is no output signal from OR gate 45; when OR gate produces a signal, read control 77 removes or cancels the inhibit signal on line 76 so that each of the switches 72 is enabled to produce an output in response to an input from the associated threshold circuits 70a – 70d.

In order to cause switches 72 to operate one at a time in response to a predetermined sensitivity ratio output from comparator 67 (assuming the cables are sensitized as shown in FIG. 5B), each switch is arranged to be disabled when the adjacent switch is enabled by the output of the associated threshold circuit. This is achieved by control lines 80a, 80b and 80c which connect the output of threshold circuits 70b, 70c and 70d, respectively, to switches 72a, 72b and 72c, respectively. Thus, for example, a disturbance occurring at section b of the cables produces signals having a magnitude difference greater than the threshold of circuit 70b but less than that of circuits 70c and 70d thereby producing an output on line 53b. While the threshold of circuit 70a is also exceeded in this instance, switch 72a is disabled by the output of circuit 70b on line 80a so that no output appears on line 53a. Lines 53a – 53d are connected to suitable indicator apparatus such as an indicator lamp display for identifying the section of the protected perimeter at which the intrusion occurred.

The invention may also be practiced using triaxial cable 84, see FIG. 10, instead of two coaxial cables 11 and 12. Such triaxial cable comprises an inner conductor 85, an intermediate cylindrically shaped coaxial conductor 86, a similarly shaped coaxial outer conductor 87, and dielectric fillers 88 and 89 between conductors 85 and 86 and conductors 86 and 87, respectively. An outer cover 90 of polyvinylchloride or the like protects outer conductor 87. Output lines 92, 93 and 94 connected to conductors 85, 86 and 87, respectively, provide two output signals from the end of the cable with one signal $V_1$ appearing across lines 85 and 86 and the other signal $V_2$ being taken across lines 86 and 87. Each length of triaxial cable 84 corresponding to a section of the protected perimeter is constructed with dielectric fillers 88 and 89 that are electrets having differently charged states so that a force applied externally to the cable produces output signals $V_1$ and $V_2$ of correspondingly different magnitudes. By serially connecting a plurality of sections of cables 84, each section being differently sensitized as described above, the location of an attempted intrusion along the protected perimeter can be determined.

Changes and modifications to the above described embodiments of the invention that are within the scope of the invention include the use of buried sensor lines rather than fence mounted lines and utilization of the system in other than intrusion detection applications such as automobile traffic monitoring systems providing the capability of resolving traffic levels in various lanes and the like.

Furthermore, in the foregoing description of a preferred embodiment of the invention, the variation in sensitivity of the cable transducers is achieved by varying the electrostatic charge on the active or electret layer. Alternatively, this sensitivity may also be varied by (a) changing the radius to the active layer as, for example, by varying the diameter of the inner conductor, (b) by varying the effective radial stiffness of the cable outside of the electret layer, or (c) varying the stiffness of the coupling of the cable to the fence. Therefore, the invention is not limited to the specific manner in which the sensitivity is varied.

What is claimed is:

1. A detection system comprising
   a plurality of longitudinally continuous laterally proximate coextensive transducers adapted to produce output electrical signals in response to a mechanical force applied to the transducers,
   the combined response of said transducers to the same force applied thereto at each of a plurality of longitudinally spaced locations being different, and
   circuit means responsive to combined output signals from said transducers for indicating the location of applications of said force.

2. The detection system according to claim 1 in which said transducers are juxtaposed coaxial electret cables.

3. The detection system according to claim 1 in which said transducers comprise a triaxial cable.

4. The detection system according to claim 1 in which each of said transducers comprises a plurality of sections in longitudinal series, said transducers being oriented relative to each other so that laterally adjacent sections are coextensive and have substantially equal lengths and constitute sets of sections, the sensitivities of each set of said sections being such that a mechanical force simultaneously applied to each section of one set produces output signals from said transducers which indicate the identity of the set to which said force is applied.

5. The system according to claim 4 in which said circuit means comprises means for comparing the outputs of said transducers for producing an output representing said identity of the set, and display means responsive to the output of said comparing means for indicating said identification.

6. An intrusion detection system comprising
   first and second laterally proximate coaxial electret cables extending along the boundary of an area to be protected,
   each of said cables having an electret filler with an electrostatic charge of predetermined strength affecting the sensitivity of the cable, at least one of said cables having a sensitivity that is different at longitudinally spaced locations along the cable whereby an output signal of different magnitude is produced by the cable as a result of a force of constant magnitude applied externally to said locations along the cable,
   means for translating an attempted intrusion of said boundary into a mechanical force applied externally to said cables,
   circuit means connected to said cables for comparing the magnitudes of the respective cable output signals and producing an output proportional to the difference in the signal magnitudes, and
   indicator means responsive to the output of said circuit means for identifying the location along said boundary of an attempted intrusion.

7. The system according to claim 6 in which said cables comprise a plurality of longitudinally successive sections of predetermined lengths, the sensitivity of said one cable being substantially constant throughout each section but being different for each of said sections.

8. The system according to claim 6 in which the sensitivity of said one cable changes linearly with distance along said boundary.

9. The system according to claim 6 with signal processor means operatively connected to the outputs of said cables and adapted to pass signals characteristic of an intruder and to block other signals, and means responsive to the output from said processor means for enabling said circuit means when intruder generated signals are received and for disabling said circuit means when said other signals are received.

* * * * *